United States Patent
Uka et al.

(10) Patent No.: US 10,366,841 B2
(45) Date of Patent: Jul. 30, 2019

(54) ELECTROLYTIC CAPACITOR

(71) Applicant: Panasonic Corporation, Osaka (JP)

(72) Inventors: Youichirou Uka, Osaka (JP); Shintaro Tanimoto, Osaka (JP); Hiroshi Kojima, Aichi (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 15/375,306

(22) Filed: Dec. 12, 2016

(65) Prior Publication Data

US 2017/0092430 A1    Mar. 30, 2017

Related U.S. Application Data

(63) Continuation of application No. PCT/JP2015/003128, filed on Jun. 23, 2015.

(30) Foreign Application Priority Data

Jun. 26, 2014  (JP) .................. 2014-131556

(51) Int. Cl.
| | |
|---|---|
| *H01G 9/00* | (2006.01) |
| *H01G 9/07* | (2006.01) |
| *H01G 9/012* | (2006.01) |
| *H01G 9/028* | (2006.01) |
| *H01G 9/042* | (2006.01) |

(52) U.S. Cl.
CPC .......... *H01G 9/028* (2013.01); *H01G 9/0032* (2013.01); *H01G 9/012* (2013.01); *H01G 9/0425* (2013.01); *H01G 9/07* (2013.01)

(58) Field of Classification Search
CPC ...... H01G 9/028; H01G 9/0032; H01G 9/012; H01G 9/045; H01G 9/07
See application file for complete search history.

(56) References Cited

U.S. PATENT DOCUMENTS

2010/0182734 A1*  7/2010  Ning .................. H01G 9/0036
361/524

FOREIGN PATENT DOCUMENTS

WO    2009/131011    10/2009

OTHER PUBLICATIONS

International Search Report of PCT application No. PCT/JP2015/003128 dated Sep. 1, 2015.

* cited by examiner

*Primary Examiner* — C Melissa Koslow
(74) *Attorney, Agent, or Firm* — McDermott Will & Emery LLP

(57) ABSTRACT

A conductive polymer layer of a electrolytic capacitor includes a conductive polymer and a polymer dopant. The polymer dopant includes; (A) a first unit originating from a first monomer having a polymerizable group and a sulfonate group; and (B) a second unit originating from a second monomer having a polymerizable group and a phosphorus-containing group. The phosphorus-containing group is represented by at least one of general formula (1); —P($=$O)(OR$^1$)(OR$^2$), general formula (2); —PH($=$O)(OR$^3$), and general formula (3); —PH$_2$($=$O). In the general formulae (1) to (3), each of R$^1$, R$^2$ and R$^3$ is independently a hydrogen atom, a hydrophilic group, a C$_1$ to C$_3$ alkyl group, or a cationic group.

15 Claims, 1 Drawing Sheet

ELECTROLYTIC CAPACITOR

RELATED APPLICATIONS

This application is a Continuation of International Application No. PCT/JP2015/003128, filed on Jun. 23, 2015, which in turn claims priority from Japanese Patent Application No. 2014-131556, filed on Jun. 26, 2014, the contents of all of which are incorporated herein by reference in their entireties.

BACKGROUND

1. Technical Field

The present disclosure relates to an electrolytic capacitor including a conductive polymer layer.

2. Description of the Related Art

As a small-sized and large-capacitance capacitor having low equivalent series resistance (ESR), an electrolytic capacitor is promising: the electrolytic capacitor having an anode body in which a dielectric layer is formed, and a conductive polymer layer formed to cover at least a part of the dielectric layer. The conductive polymer layer contains a π-conjugated polymer and a dopant. The use of the dopant gives the π-conjugated polymer a high conductivity. The dopant is generally a polymer dopant having a sulfonate group (see WO 09/131011 pamphlet).

SUMMARY

An electrolytic capacitor of an aspect according to the present disclosure includes an anode body, a dielectric layer formed on the anode body, and a conductive polymer layer covering at least a part of the dielectric layer. The conductive polymer layer includes; (A) a first unit originating from a first monomer having a polymerizable group and a sulfonate group, and (B) a second unit originating from a second monomer having a polymerizable group and a phosphorus-containing group. The phosphorus-containing group is represented by at least one of the following general formulae;

 general formula (1):

 general formula (2):

 general formula (3):

In the general formulae (1) to (3), each of $R^1$, $R^2$ and $R^3$ is independently a hydrogen atom, a hydrophilic group, a $C_1$ to $C_3$ alkyl group, or a cationic group.

According to the present disclosure, an electrolytic capacitor can be obtained in which an effect of repairing its dielectric layer is enhanced to decrease leakage currents.

DETAILED DESCRIPTION OF EMBODIMENT

Figure 1:
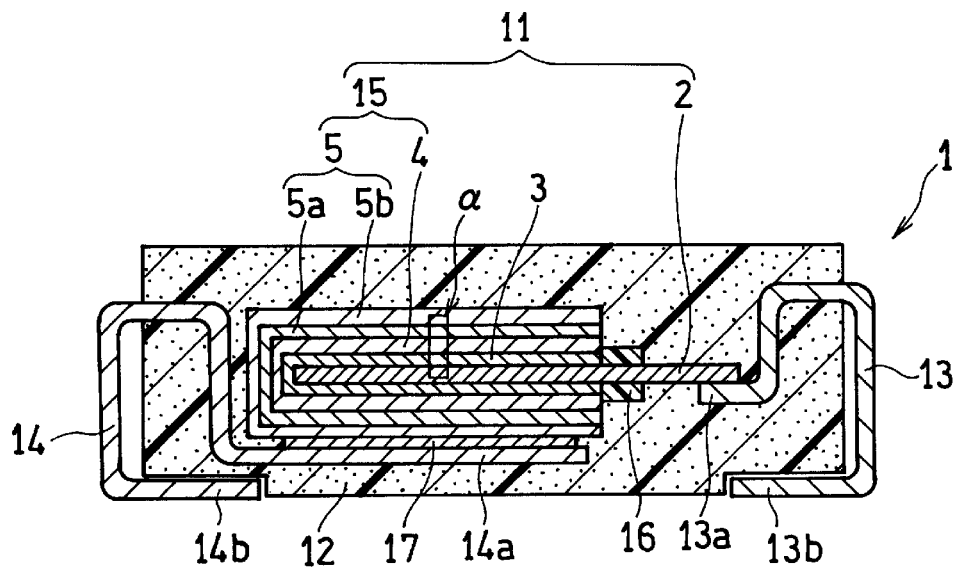
FIG. 1 is a schematic sectional view of an electrolytic capacitor according to an exemplary embodiment in the present disclosure.

Although polymer dopants each having a sulfonate group are excellent in a function of heightening a conductivity of conductive polymer layer, the dopants have a limit in a function of decreasing leakage currents of an electrolytic capacitor.

An electrolytic capacitor according to the present exemplary embodiment includes an anode body, a dielectric layer formed on the anode body, and a conductive polymer layer covering at least a part of the dielectric layer. The conductive polymer layer contains a conductive polymer and a polymer dopant. The polymer dopant includes: (A) a first unit originating from a first monomer having a polymerizable group and a sulfonate group; and (B) a second unit originating from a second monomer having a polymerizable group and a phosphorus-containing group. The matter that the polymer dopant includes the second unit enhances an effect of repairing the dielectric layer.

The polymerizable group is preferably a radical polymerizable group. Examples of the group include a carbon-carbon double bond, and a carbon-carbon triplet bond.

The first monomer is, for example, a vinyl monomer having a sulfonate group, or a diene monomer having a sulfonate group (such as isoprene sulfonic acid). Examples of the vinyl monomer having a sulfonate group include vinylsulfonic acid, allylsulfonic acid, 2-acrylamide-2-methylpropanesulfonic acid, styrenesulfonic acid, styrenesulfonic acid derivatives. Examples of the styrenesulfonic acid derivatives include styrenesulfonates (such as sodium styrenesulfonate), divinylbenzenesulfonic acid and salts thereof, and vinyltoluenesulfonic acid and salts thereof. The first monomer may be used singly, or in any combination of two or more thereof.

The second monomer is, for example, a vinyl monomer having a phosphorus-containing group, or a diene monomer having a phosphorus-containing group. The second monomer may be used singly, or in any combination of two or more thereof.

The phosphorus-containing group is represented by the following:

 general formula (1):

 general formula (2):

 general formula (3):

In other words, the phosphorus-containing group is represented by at least one of the general formulae (1) to (3). Herein, each of $R^1$, $R^2$ and $R^3$ is independently a hydrogen atom, a hydrophilic group, a $C_1$ to $C_3$ alkyl group, or a cationic group.

The hydrophilic group preferably has at least one selected from the group consisting of carboxyl, acid anhydride, hydroxyl, and $C_2$ to $C_3$ alkylene oxide groups. The hydrophilic group appears to heighten the second monomer in solubility or dispersibility to water. Thus, the hydrophilic group makes a synthesis of the polymer dopant easy.

The $C_1$ to $C_3$ alkyl group is preferably at least one selected from the group consisting of methyl, ethyl, n-propyl, and isopropyl groups.

The cationic group (M) is a group which forms an —OM group having an ion bonding property and bondable directly to a phosphorus atom. Examples of the cationic group include metal cations, an ammonium ion ($NH_4^+$), and organic cations. The metal cations are preferably monovalent metal cations such as a sodium ion and a potassium ion. Examples of the organic cations include quaternary ammonium ions, sulfonium ions, and phosphonium ions.

The second monomer can be represented by, for example, $R^a R^b C = CX^a R^c$, $R^d X^b C = CX^c R^e$. Herein, $X^a$ to $X^c$ are each independently a group having a phosphorus-containing group. $X^a$ to $X^c$ may each be only a phosphorus-containing group, or may have, between the carbon atom which forms the vinyl group and the phosphorus-containing group, for example, an alkylene, oxyalkylene or polyoxyalkylene group. The second monomer made only of a phosphorus-containing group in $X^a$ to $X^c$ may be, for example, vinyl phosphonate, or vinyl phosphinate. $R^a$ to $R^e$ are each independently a hydrogen atom, or an alkyl group such as a methyl group.

The second monomer, which is a single monomer (species), may have two or more phosphorus-containing groups. In this case, the single second monomer may have plural phosphorus-containing groups represented by two or more general formulae selected from the general formulae (1) to (3).

When two or more second monomers are used, these second monomers may respectively contain phosphorus-containing groups represented by the same general formula, or may respectively contain phosphorus-containing groups represented by general formulae different from each other.

When the phosphorus-containing group is represented by the general formula (1), each of $R^1$ and $R^2$ is preferably independently a hydrogen atom or a cationic group. This case further enhances the dielectric-layer-repairing function of the conductive polymer layer, and also enhances the leakage-current-decreasing effect. It is also preferred that the second monomer contains the phosphorus-containing group in which at least one of $R^1$ and $R^2$ is a hydrogen atom. The repairing function based on the phosphorus-containing group can be further enhanced by a matter that the hydrogen atom of $R^1$ or $R^2$ is disassociated in the conductive polymer layer.

Similarly, when the phosphorus-containing group is represented by the general formula (2), $R^3$ is preferably a hydrogen atom or a cationic group. This case further enhances the dielectric-layer-repairing function of the conductive polymer layer, and also enhances the leakage-current-decreasing effect.

The polymer dopant contains, for example, a copolymer including the first unit and the second unit. The copolymer may be a random copolymer or a block copolymer. The random copolymer is preferred from the viewpoint of gaining an even repairing function in the whole of the conductive polymer layer.

The copolymer may contain a third unit originating from a third monomer other than the first monomer and the second monomer. The contained third unit may be of one or more species. In the polymer dopant, the sum of a number of the first unit and a number of the second unit is preferably larger than a number of the third unit.

The polymer dopant may also include a first polymer containing the first unit, and a second polymer containing the second unit. In other words, it is unnecessary that the polymer dopant is a copolymer made from the first monomer and the second monomer. In order to heighten a distribution of individuals of the phosphorus-containing group in evenness, and heighten the repairing function based on the phosphorus-containing group, the use of the copolymer is more preferred.

The first polymer may include a third unit originating from a third monomer other than the first monomer. Similarly, the second polymer may include a third unit originating from a third monomer other than the second monomer. In the polymer dopant, the sum of a number of the first unit included in the first polymer and a number of the second unit included in the second polymer is preferably larger than a number of the third unit included in the first polymer and/or the second polymer. In the first polymer and/or the second polymer, the contained third unit may be of one or more species.

In any one of the case of using the copolymer and the case of using the first polymer and the second polymer together, the proportion of the second unit into the total of the first and the second unit is preferably from 5% by mole to 50% by mole both inclusive, more preferably from 10% by mole to 40% by mole both inclusive, in particular preferably from 15% by mole to 25% by mole both inclusive. When the proportion of the second unit is within the ranges, effects of the first unit and the second unit are exhibited with a good balance to improve the conductive polymer easily in conductivity and dispersibility, and further improve the dielectric-layer-repairing function of the conductive polymer layer.

The third monomer is not particularly limited about the species thereof as far as the monomer is a monomer copolymerizable with the first monomer and/or the second monomer. Preferred examples of the third monomer include maleimide, fumaric acid esters, maleic acid esters, (meth) acrylic acid esters, and respective derivatives of these compounds.

When an inexpensive polymer dopant that can easily be synthesized is gained, it is preferred to use, as the first monomer, at least one selected from the group consisting of styrenesulfonic acid and styrenesulfonic acid derivatives. It is also preferred to use, as the second monomer, a (meth) acrylic acid derivative and/or a maleic acid derivative.

The (meth)acrylic acid derivative can be represented by the following general formula (4): $R^4R^5C=CX^1R^6$. The maleic acid derivative can be represented by the following general formula (5): $R^7X^2C=CX^3R^8$. In this case, $X^1$ to $X^3$ are each independently a group having an oxycarbonyl bond; and are each preferably represented by, for example, the following general formula (6): —CO—(OCH$_2$CH$_2$)$_n$—O—P(=O)(OR$^1$)(OR$^2$)

In order to form a more homogeneous conductive polymer layer, in the general formulae (4) and (5), n is preferably a number from 1 to 10. Each of $R^1$ and $R^2$ is independently preferably a hydrogen atom or a cationic group. $R^4$ to $R^8$ are each independently preferably a hydrogen atom or a methyl group.

In order to form an even more homogeneous conductive polymer layer, in the general formulae (4) and (5), n is more preferably a number from 2 to 5, in particular preferably a number from 4 to 5. Each of $R^4$, $R^5$, $R^7$ and $R^8$ is more preferably a hydrogen atom. Each of $R^1$ and $R^2$ is more preferably a hydrogen atom or a cationic group.

Hereinafter, with reference to the drawings, exemplary embodiments according to the present disclosure will be described. In the drawings, the same reference numbers or signs are attached, respectively, to parts or members identical with each other, or corresponding to each other, and an duplicated description about the parts or members is not to be repeated. In the drawings, relationships between any length, size, width and other dimensions are appropriately varied in order to clarify and simplify the drawings, so that actual dimensions thereof are not illustrated.

<Structure of Electrolytic Capacitor>

Figure 2:
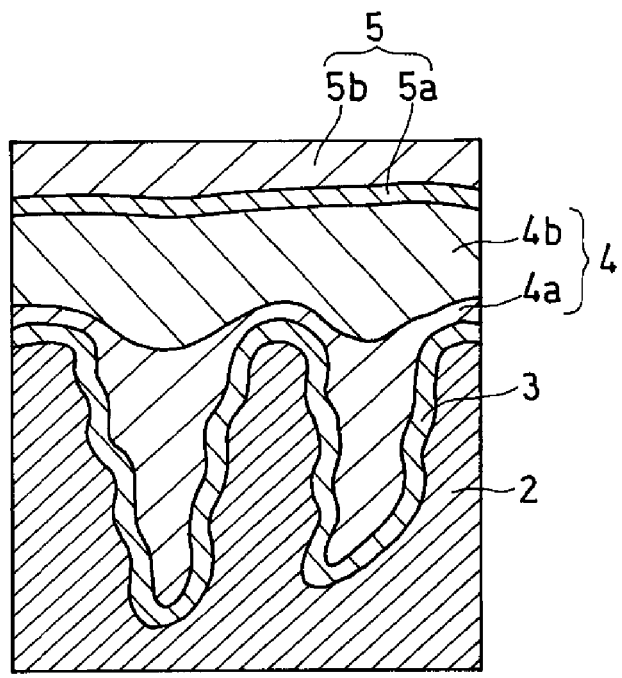
FIG. 2 is an enlarged view of a region surrounded by a solid line α in FIG. 1.

FIG. 1 is a schematic sectional view of an electrolytic capacitor according to the present exemplary embodiment. FIG. 2 is an enlarged view of a region surrounded by a solid line α. Electrolytic capacitor 1, has capacitor element 11, resin outer package 12 for sealing capacitor element 11, and anode terminal 13 and cathode electrode 14 each made naked outside resin outer package 12. Capacitor element 11 includes anode body 2 (or anode portion) in a foil-piece or plate shape, dielectric layer 3 covering a one-end-portion side of anode body 2, and cathode portion 15 covering dielectric layer 3. Anode terminal 13 is electrically connected to anode body 2, and cathode terminal 14 is electrically connected to cathode portion 15. Resin outer package 12 has a substantially rectangular parallelepiped external shape. By this matter, electrolytic capacitor 1 also has a substantially rectangular parallelepiped external shape.

Anode body 2 and cathode portion 15 are opposed to each other across dielectric layer 3. Cathode portion 15 has conductive polymer layer 4 covering dielectric layer 3, and cathode layer 5 covering conductive polymer layer 4. Cathode layer 5 illustrated has a bilayered structure, and has carbon layer 5a contacting conductive polymer layer 4, and silver paste layer 5b covering the surface of carbon layer 5a.

At the other end portion of anode body 2 that is projected from cathode portion 15 and in a region of anode body 2 that is adjacent to cathode portion 15, insulating separation portion 16 is formed to cover surfaces of anode body 2 into a band form, so that contact between cathode portion 15 and anode body 2 is restricted. The other end portion of anode body 2 that is projected from cathode portion 15 is electrically connected to first end portion 13a of anode terminal 13 by, e.g., welding. Silver paste layer 5b formed as the outermost layer of cathode portion 15 is electrically connected to first end portion 14a of cathode terminal 14 through conductive adhesive material 17 (such as a mixture of a thermosetting resin and metallic particles). Second end portion 13b of anode terminal 13, and second end portion 14b of cathode terminal 14 are pulled out, respectively, from different side-surfaces of resin outer package 12 to be extended in a naked state to one of the main flat surfaces of the electrolytic capacitor (the lower surface of the electrolytic capacitor in FIG. 1). In this flat surface, a position where each of the terminals is naked is used for connection with a substrate (not illustrated) on which electrolytic capacitor 1 is to be mounted, using, e.g., a solder.

Hereinafter, the structure of the electrolytic capacitor will be described in more detail.

[Anode Body]

For the anode body, a conductive material of large surface area is usable. Examples of the conductive material include valve metals, alloys each containing a valve metal, and compounds each containing a valve metal. These materials may be used singly or in any combination of two or more thereof. The valve metals may be preferably, for example, titanium, tantalum, aluminum and niobium. Not only these metals but also respective oxides of the metals are high in dielectric constant to be each suitable for a constituent material of the anode body. The anode body is, for example, a body obtained by roughening one or more surfaces of a substrate (in the shape of, e.g., a foil-piece or plate) made of a conductive material; or a shaped body or sintered body of particles of a conductive material.

[Dielectric Layer]

The dielectric layer is formed on at least one portion of one or more surfaces of the anode body. Specifically, the dielectric layer can be formed by anodizing the surface(s) of the conductive material constituting the anode body. When the anode body is in the shape of a foil-piece or plate and the surface(s) of the anode body is/are roughened, the dielectric layer is formed, as illustrated in FIG. 2, along inner wall surfaces of holes or pits in the surface(s) of anode body 2.

The dielectric layer contains an oxide of the conductive material (which is, particularly, a valve metal) constituting the anode body. When, for example, tantalum is used as the valve metal, the dielectric layer contains $Ta_2O_5$. When aluminum is used as the valve metal, the dielectric layer contains $Al_2O_3$. The dielectric layer is not limited to such dielectric layers. Thus, the dielectric layer may be any layer as far as the layer functions as a dielectric substance.

Since the dielectric layer is formed along the surface(s) of the anode body, irregularities are made in the surface(s) of the dielectric layer in accordance with the shape of the surface(s) of the anode body. A portion of the conductive polymer layer is formed preferably to embed the irregularities of the dielectric layer into the portion.

[Conductive Polymer Layer]

The conductive polymer layer contains a conductive polymer and a polymer dopant. The conductive polymer layer is formed to cover at least a part of the surface(s) of the dielectric layer. It is desired that the conductive polymer layer covers regions of the outer surface(s) of the dielectric layer as largely as possible.

In the case illustrated in FIGS. 1 and 2, conductive polymer layer 4 formed to cover dielectric layer 3 has first conductive polymer layer 4a covering dielectric layer 3, and second conductive polymer layer 4b covering first conductive polymer layer 4a. However, the structure of the conductive polymer layer is not particularly limited, and may be a monolayered structure, or a multilayered structure of two or more layers.

[Conductive Polymer]

The conductive polymer may be a known conductive polymer usable for an electrolytic capacitor, and is, for example, a π-conjugated conductive polymer. The conductive polymer is, for example, a polymer having, as a basic skeleton thereof, polypyrrole, polythiophene, polyfuran, polyaniline, polyacetylene, polyphenylene, polyphenylenevinylene, polyacene, and/or polythiophenevinylene. The conductive polymer may be a homopolymer, or a copolymer made from two or more monomers, or any derivative (such as a substituted body having a substituent) of the homopolymer or copolymer. For example, the polymer having, as a basic skeleton thereof, polythiophene is, for example, poly (3,4-etylenedioxythiophene). The conductive polymer may be used singly or in any combination of two or more thereof. The conductive polymers are high in conductivity and excellent in ESR property. The weight-average molecular weight of the conductive polymers is not particularly limited, and is, for example, from 1000 to 1,000,000 both inclusive.

[Polymer Dopant]

The polymer dopant includes: (A) an unit originating from a first monomer having a polymerizable group and a sulfonate group; and (B) an unit originating from a second monomer having a polymerizable group and a phosphorus-containing group. This matter enhances the conductive polymer layer in dielectric-layer-repairing function.

The weight-average molecular weight of the polymer dopant is, for example, from 10,000 to 1,000,000 both inclusive, preferably from 30,000 to 500,000 both inclusive. The use of the polymer dopant having such a molecular weight makes the homogenization of the conductive polymer layer easy.

The amount of the dopant contained in the conductive polymer layer is preferably from 10 parts by mass to 1000 parts by mass both inclusive, more preferably from 50 parts by mass to 400 parts by mass both inclusive for 100 parts by mass of the conductive polymer.

[Cathode Layer]

The carbon layer as the cathode layer may be any carbon layer as far as the carbon layer has conductivity. The carbon layer may be formed, using graphite. For the silver paste layer, for example, a composition containing silver powder and an epoxy resin may be used.

The anode terminal and the cathode terminal may each be made of, e.g., a metal, such as copper or a copper alloy. A raw material for the resin outer package may be, e.g., an epoxy resin.

<Method for Synthesizing Polymer Dopant>

The polymer dopant can be synthesized by radical polymerization. For example, a homogeneous monomer solution containing a solvent, a first monomer and/or a second monomer, and an optional third monomer are charged into a reactor. The inside of the reactor is deoxygenated, and then a polymerization initiator is added to the monomer solution to advance a polymerization reaction at a predetermined temperature. If necessary, a molecular weight adjustor that may be of various types may be added to the monomer solution. The monomer solution may be charged into the reactor in plural times in order to avoid a rapid polymerization reaction.

At this time, in the case of using the solution containing the first and second monomers, a polymer dopant of a copolymer can be obtained which contains the first unit and the second unit. In the meantime, in the case of using a solution which contains the first monomer but does not contain the second monomer, a first polymer containing the first unit can be obtained. Similarly, in the case of using a solution which contains the second monomer but does not contain the first monomer, a second polymer containing the second unit can be obtained.

The solvent in which the first and/or second monomer(s) is/are to be dissolved is preferably water. A water-soluble solvent may be used, or a mixture of water and a water-soluble solvent may be used. The water-soluble solvent is not particularly limited. Examples of the solvent include acetone, tetrahydrofuran, methanol, ethanol, isopropanol, and N-methyl-2-pyrrolidone.

The molecular weight adjustor is not particularly limited, and may be, for example, a thiol type compound, or quinone type compound.

The polymerization initiator is not particularly limited, and may be, for example, a peroxide, or an azo compound. Examples of the peroxide include ammonium persulfate, potassium persulfate, hydrogen peroxide, cumene hydroperoxide, and di-t-butylperoxide. Examples of the azo compound include 2,2'-azobis(4-methoxy-2,4-dimethylvaleronitrile), 2,2'-azobis(2,4-dimethylvaleronitrile), and 2,2'-azobisisobutyronitrile.

<Method for Synthesizing Conductive Polymer>

In the presence of the polymer dopant, a raw monomer for the conductive polymer is polymerized. By the polymerization, a polymer-dopant-doped conductive polymer can be synthesized. As the polymerizing method, either of chemical oxidation polymerization and electrolytic oxidation polymerization can be adopted.

The electrolytic oxidation polymerization is advanced by applying, for example, a constant current of from 0.05 $mA/cm^2$ to 10 $mA/cm^2$ or a constant voltage of from 0.5 V to 10 V to a polymerizing liquid containing the raw monomer, for the conductive polymer, and the polymer dopant. A catalyst may be added to the polymerizing liquid to promote the polymerization. The catalyst may be, for example, ferrous sulfate, or ferric sulfate.

The chemical oxidation polymerization can be advanced by mixing the raw monomer, for the conductive polymer, with the polymer dopant and an oxidizer. The oxidizer used at the time of the chemical oxidation polymerization is, for example, a persulfate such as ammonium persulfate, sodium persulfate or potassium persulfate. At this time, as a catalyst, for example, ferrous sulfate, or ferric sulfate may be used.

When the chemical oxidation polymerization and the electrolytic oxidation polymerization are conducted, a solvent may be used in which the raw monomer and the polymer dopant are dissolved or dispersed. The solvent is preferably the above-mentioned solvent, such as water or a water-soluble solvent. At this time, the conductive polymer is obtained in the state of being dispersed in the solvent. Thereafter, it is preferred to remove impurities, such as the unreacted monomer, the un-doped or excessive dopant, persulfates, and the catalyst by, e.g., dialysis or an ion exchange method.

The chemical oxidation polymerization may also be conducted in the presence of the anode body having the dielectric layer. In this case, the produced conductive polymer, together with the polymer dopant, adheres onto the dielectric layer to cover this layer.

<Method for Producing Electrolytic Capacitor>

The following will describe a method for producing the electrolytic capacitor.

[First Step]

Initially, an anode body is prepared. The anode body is obtained, for example, by roughening one or more surfaces of a foil-piece or plate shape substrate made of a conductive material. The roughening method may be any method as far as the method makes it possible to make irregularities in the surface(s) of the substrate. For example, the substrate surface(s) may be etched (for example, electrolytically etched); or conductive material particles may be deposited onto the substrate surface(s), using a gas phase method, such as vapor deposition.

[Second Step]

Next, a dielectric layer is formed on the anode body. The dielectric layer is formed by anodizing one or more surfaces of the anode body. The anodization can be performed by a known anodizing treatment. The anodizing treatment can be conducted, for example, by immersing the anode body into a anodizing liquid, and then applying a voltage to the anode body as an anode, and a cathode immersed in the anodizing liquid across these electrodes. The anodizing liquid is preferably, for example, an aqueous phosphoric acid solution, an aqueous ammonium phosphate solution, or an aqueous ammonium adipate solution.

[Third Step]

Next, the anode body, on which the dielectric layer is formed, is immersed into a first treating liquid to impregnate the anode body, on which the dielectric layer is formed, with the first treating liquid. The resultant workpiece is then dried to form a first conductive polymer layer covering at least a part of the dielectric layer. Next, the anode body, in which the first conductive polymer layer is formed, is immersed into a second treating liquid to impregnate the anode body, in which the first conductive polymer layer is formed, with the second treating liquid. Thereafter, the workpiece is dried to form a second conductive polymer layer covering at least a part of the first conductive polymer layer.

The first treating liquid and/or the second treating liquid contain(s) a polymer dopant which contains a first unit originating from the first monomer, and a second unit originating from the second monomer, as described above. When at least the first treating liquid contains the polymer dopant containing the first unit and the second unit, the conductive polymer layer is easily enhanced in dielectric-layer-repairing function.

When the dielectric layer is exposed from the first conductive polymer layer, the polymer dopant containing the first unit and the second unit may be incorporated only into the second treating liquid. Also in this case, the conductive polymer layer is easily enhanced in dielectric-layer-repairing function.

When the first conductive polymer layer has small thickness (the layer has, e.g., a thickness of 5 μm or less), the polymer dopant in the second treating liquid would penetrate to the surface of the dielectric layer. Thus, also in this case, the conductive polymer layer is easily enhanced in dielectric-layer-repairing function by incorporating the polymer dopant containing the first unit and the second unit only into the second treating liquid.

The first treating liquid and/or the second treating liquid may be, for example, a conductive polymer in the state of being dispersed in a solvent, that is, a liquid dispersion of a conductive polymer. In this case, only by immersing the anode body into the treating liquid(s) and then pulling up the anode body, the conductive polymer layer can be formed. As described above, the liquid dispersion of the conductive polymer can be obtained by using a solvent to polymerize a precursor monomer of this polymer in the presence of the polymer dopant. It is not necessarily essential that the precursor monomer is a monomer. Thus, a conception of the precursor monomer includes, for example, an oligomer having a low molecule.

The first treating liquid and/or the second treating liquid may be a treating liquid containing a precursor monomer which is a raw material of the conductive polymer, a dopant, an oxidizer, and others. In this case, the following processes advance concurrently: the polymerization of the monomer in the treating liquid; and the formation of a conductive polymer layer onto the dielectric layer. At this time, as the dopant, a low molecular weight dopant may be used in addition of a polymer dopant. It is also allowable to use a polymer dopant in one of the first treating liquid and the second treating liquid, and use, as the other, a treating liquid containing a precursor monomer which is a raw material of the conductive polymer, a dopant, an oxidizer and others. In this case, a low molecular weight dopant may be used as the dopant in the other.

Examples of the low molecular weight dopant include alkylbenzenesulfonic acids such as benzenesulfonic acid and p-toluenesulfonic acid, naphthalenesulfonic acid, and anthraquinonesulfonic acid.

In the above-mentioned exemplary embodiment, the description has been made about the case of forming a conductive polymer layer having a bilayered structure including a first conductive polymer layer and a second conductive polymer layer. However, the technique according to the present disclosure is not limited to this exemplary embodiment. For example, the conductive polymer layer may have a monolayered structure, or a structure of three or more layers.

The second conductive polymer layer may be formed by electrolytic polymerization. In this case, it is advisable to immerse the anode body having the first conductive polymer layer into the second treating liquid, and then apply a current or voltage to the anode body.

In the chemical oxidation polymerization, it is allowable to immerse the anode body having the dielectric layer into a treating liquid containing a precursor monomer, and then immerse the anode body separately into a solution containing a dopant and/or an oxidizer. It is conversely allowable to immerse the anode body having the dielectric layer into a solution containing a dopant and/or an oxidizer, and then immerse the anode body into a treating liquid containing a precursor monomer.

After the formation of the conductive polymer layer, a carbon layer, a silver paste, an anode body terminal, an adhesive layer, a cathode terminal, and others are fitted to the anode body. At last, the resultant element is sealed with a resin outer package to produce an electrolytic capacitor.

The electrolytic capacitor according to the present disclosure is not limited to the electrolytic capacitor having the above-mentioned structure. Thus, the present disclosure is applicable to electrolytic capacitors having various structures, respectively. Specifically, the present disclosure is applicable also to, for example, a winding type electrolytic capacitor, or an electrolytic capacitor in which a sintered body of metallic powder is used as an anode body. The usage of the conductive polymer layer according to the present disclosure is not limited to any electrolytic capacitor. Thus, the conductive polymer layer is applicable also to an antistatic layer, an electromagnetic shield member, an integrated circuit, an organic thin membrane solar cell, a colorant sensitizing layer, an organic EL panel, various electrodes, and other various conductive thin films.

EXAMPLES

The present disclosure will be more specifically made by way of working examples. However, the present disclosure is not limited to the examples.

Production Example 1

One liter of pure water was poured to a 2-L separable flask equipped with a stirrer. To the flask were added 132 g of sodium styrenesulfonate as a first monomer, and 34 g of an acrylic acid derivative, as a second monomer, represented by the following formula (7): $CH_2=CH-CO-OCH_2CH_2-O-P(=O)(OH_2)$. In this way, a homogeneous monomer solution was yielded. Furthermore, 0.5 g of ammonium persulfate as an oxidizer was added to this monomer solution. Then, a polymer dopant of a copolymer was obtained by advancing a polymerization reaction between the first monomer and the second monomer over 8 hours. Thereafter, pure water and an ion exchange resin were added to the polymer dopant, and these components were then stirred and filtrated. This operation was repeated to remove impurities.

A gel permeation chromatography (GPC) was used to analyze a molecular weight of the resultant copolymer. As a result, the copolymer had a weight-average molecular weight of about 70,000. The ratio by mole between first unit originating from the first monomer and second unit originating from the second monomer, the ratio being calculated from the ratio between the charged monomers, was as follows: the first unit/the second unit=80/20.

Production Example 2

A polymer dopant of a copolymer was yielded in the same way as in Production Example 1 except the use of an acrylic acid derivative represented by the following formula (8): $CH_2=CH-CO-(OCH_2CH_2)_5-O-P(=O)(OH_2)$ as the second monomer. The copolymer had a weight-average molecular weight of about 90,000. The ratio by mole between its first unit and its second unit, the ratio being calculated from the ratio between the charged monomers, was as follows: the first unit/the second unit=80/20.

Production Examples 3 to 7

Various polymer dopants made of copolymers, respectively, were each yielded in the same way as in Production Example 2 expect that the ratio between the charged first and second monomers was changed. The respective weight-average molecular weights of the dopants were within a range from 30,000 to 200,000. The ratio by mole between first unit and second unit of each of the dopants, the ratio being calculated from the ratio between the charged monomers, was as follows:

Production Example 3: the first unit/the second unit=95/5,
Production Example 4: the first unit/the second unit=90/10,
Production Example 5: the first unit/the second unit=75/25
Production Example 6: the first unit/the second unit=60/40, and
Production Example 7: the first unit/the second unit=50/50.

Production Example 8

A polymer dopant (first polymer) was yielded in the same way as in Production Example 1 except that only sodium styrenesulfonate as the first monomer was used in an amount of 165 g without using the second monomer. The polymer had a weight-average molecular weight of about 110,000.

Production Example 9

A polymer dopant (second polymer) was yielded in the same way as in Production Example 1 except that 73 g of the second monomer represented by the formula (8) was used without using the first monomer, and acrylic acid was used as a third monomer to yield a polymer dopant of a copolymer. This polymer dopant had a weight-average molecular weight of about 60,000. The ratio by mole between second unit originating from the second monomer and acrylic acid unit originating from acrylic acid, the ratio being calculated from the ratio between the charged monomers, was as follows: the second unit/the acrylic acid unit=50/50.

Production Example 10

A polymer dopant of a copolymer was yielded in the same way as in Production Example 1 except the use of an acrylic acid derivative represented by the following formula (9): $CH_2=CH-CO-(OCH_2CH_2)_5-O-P(=O)(ONa)_2$. The copolymer had a weight-average molecular weight of about 90,000. The ratio by mole between its first unit and its second unit, the ratio being calculated from the ratio between the charged monomers, was as follows: the first unit/the second unit=80/20.

Production Example 11

A polymer dopant of a copolymer was yielded in the same way as in Production Example 1 except the use of an acrylic acid derivative represented by the following formula (10) as the second monomer: $CH_2=CH-CO-(OCH_2CH_2)_{10}-O-P(=O)(OH)_2$. The copolymer had a weight-average molecular weight of about 90,000. The ratio by mole between its first unit and its second unit, the ratio being calculated from the ratio between the charged monomers, was as follows: the first unit/the second unit=80/20.

Production Example A

A liquid dispersion in which the polymer dopant yielded in Production Example 1 was dispersed in water (copolymer content: 3% by mass) was poured into a 1-L container equipped with a stirrer. Next, 2 parts by mass of sodium persulfate as an oxidizer and 0.2 parts by mass of ferric sulfate as a catalyst were added to 100 parts by mass of this polymer-dopant-dispersed aqueous liquid dispersion. Subsequently, a chemical oxidation polymerization was conducted by gradually dropping 1 part by mass of 3,4-ethylenedioxythiophene to the resultant. Thereafter, an ion exchange resin was added to the resultant aqueous liquid dispersion containing the polymer dopant and the resultant conductive polymer (poly-3,4-ethylenedioxythiophene), and then these components were stirred and filtrated. This operation was repeated to remove impurities in the liquid to yield a conductive polymer doped with the polymer dopant.

Production Examples B to G

Polymer-dopant-doped conductive polymers were each yielded in the same way as in Production Example A except the use of an aqueous liquid dispersion of the polymer dopant yielded in one of Production Examples 2 to 7, in which the polymer dopant contained the first unit and the second unit.

Production Example H

A polymer-dopant-doped conductive polymer was yielded in the same way as in Production Example A except the use of the polymer-dopant-dispersed aqueous liquid dispersion yielded in Production Example 8, in which the polymer dopant contained only the first unit.

Production Example I

The polymer dopant yielded in Production Example 8 and the polymer dopant yielded in Production Example 9 were mixed with each other to set the ratio by mole of the first unit to the second unit to 80/20. A polymer-dopant-doped conductive polymer was yielded in the same way as in Production Example A except the use of the resultant mixture.

Production Example J

A polymer-dopant-doped conductive polymer was yielded in the same way as in Production Example A except the use of the polymer-dopant-dispersed aqueous liquid yielded in Production Example 10, in which the polymer dopant contained the first unit and the second unit.

Production Example K

A polymer-dopant-doped conductive polymer was yielded in the same way as in Production Example A except the use of the polymer-dopant-dispersed aqueous liquid yielded in Production Example 11, in which the polymer dopant contained the first unit and the second unit.

Example 1

An electrolytic capacitor was produced and properties thereof were evaluated in accordance with the following manners:

(1) Step of Preparing Anode Body (First Step)

Both surfaces of an aluminum foil piece (thickness: 100 μm) as a substrate were etched to be roughened. In this way, an anode body was produced.

(2) Step of Forming Dielectric Layer (Second Step)

One end side of the anode body (the side: a region extending from a separation portion of this body to one end portion thereof) was immersed in a chemical liquid, and a DC voltage of 70 V was applied to the workpiece for 20 minutes to form a dielectric layer containing aluminum oxide.

(3) Step of Forming Conductive Polymer Layer (Third Step)

(3-1) Step of Forming First Conductive Polymer Layer (Step A)

The anode body having the dielectric layer was immersed in an aqueous liquid dispersion (first treating liquid) containing 1% by mass of the polymer-dopant-doped conductive polymer yielded in Production Example H (containing the polymer dopant of Production Example 8). The anode body was then taken out from the first treating liquid, and dried at 120° C. for a period from 10 minutes to 30 minutes both inclusive. Each of the immersion in the first treating liquid and the drying was further repeated once to form a first conductive polymer layer to cover at least a part of the surface of the dielectric layer. According to a measurement of the first conductive polymer layer through a scanning electron microscope (SEM), this layer had an average thickness of about 1 μm.

(3-2) Step of Forming Second Conductive Polymer Layer (Step B)

The anode body having the first conductive polymer layer was immersed in an aqueous liquid dispersion (second treating liquid) containing 4% by mass of the polymer-dopant-doped conductive polymer yielded in Production Example A. The anode body was then taken out from the second treating liquid, and dried at 120° C. for a period from 10 minutes to 30 minutes both inclusive. Each of the immersion in the second treating liquid and the drying was further repeated twice to form a second conductive polymer layer to cover at least a part of the surface of the first conductive polymer layer, and at least a part of the dielectric layer exposed from the first conductive polymer layer. According to a measurement of the second conductive polymer layer through a scanning electron microscope (SEM), this layer had an average thickness of about 30 μm.

(4) Step of Forming Cathode Layer (Fourth Step)

The anode body having the dielectric layer covered with the conductive polymer layers was immersed in a liquid dispersion in which graphite particles were dispersed in water. The anode body was then taken out from the liquid dispersion, and then dried to form a carbon layer. The drying was performed at a temperature from 130° C. to 180° C. both inclusive for a period from 10 minutes to 30 minutes both inclusive.

Next, a silver paste containing silver particles and a binder resin (epoxy resin) was applied onto the surface of the carbon layer, and the workpiece was heated at a temperature from 150° C. to 200° C. both inclusive for a period from 10 minutes to 60 minutes both inclusive to cure the binder resin to form a silver paste layer. In this way, a cathode layer was formed which was composed of the carbon layer and the silver paste layer. As described hereinabove, a capacitor element was produced.

(5) Fabrication of Electrolytic Capacitor

The cathode layer of the capacitor element was joined with one end portion (first end portion) of a cathode terminal with a conductive adhesive. A different end portion of the anode body which was projected from the capacitor element was joined with one end portion (first end portion) of an anode terminal by laser welding.

Next, a resin outer package made of an insulating resin was formed around the capacitor element by a transfer molding method. At this time, the other end portion (second end portion) of the anode terminal, and the other end portion (second end portion) of the cathode terminal were made into a state of being pulled out from the resin outer package. In this way, an electrolytic capacitor A of Example 1 was finished. In the same way as described hereinabove, electrolytic capacitors were produced in a total number of 250.

Examples 2 to 7

Respective electrolytic capacitors B to G of Examples 2 to 7 were produced in the same way as in Example 1 except the use of the aqueous liquid dispersions (second treating liquids) which respectively contained the polymer-dopant-doped conductive polymers yielded in Production Example B to G. In each of these examples, a total number of the produced electrolytic capacitors was 250.

Comparative Example 1

Electrolytic capacitors H of Comparative Example 1 were produced in a total number of 250 in the same way as Example 1 except that their second conductive polymer layer was formed, using an aqueous liquid dispersion (second treating liquid) containing 4% by mass of the polymer-dopant-doped conductive polymer yielded in Production Example H.

Example 8

Electrolytic capacitors I of Example 8 were produced in a total number of 250 in the same way as Example 1 except the use of an aqueous liquid dispersion (second treating liquid) containing the polymer-dopant-doped conductive polymer yielded in Production Example I.

(6) Evaluations (a) Equivalent Series Resistance (ESR)

From the electrolytic capacitors, 120 pieces of the electrolytic capacitors were randomly selected. A four-terminal-measuring LCR meter was used to measure the ESR value (mΩ) of each of the electrolytic capacitors at a frequency of 100 kHz. The average value of the resultant values was then gained.

(b) Leakage Current (LC)

A voltage of 10 V was applied to the anode body 2 and the cathode layer 5 of each of the electrolytic capacitors across the body and the layer. After 40 seconds, a leakage current from the electrolytic capacitor was measured. The electrolytic capacitor was judged to be good when the leakage current quantity was 100 μA or less. In each of the (comparative) examples, the proportion of the resultant good products was calculated out.

(c) Voltage Resistance

A voltage was applied to each of the electrolytic capacitors judged to be good in the above-mentioned item while the voltage was raised at a rate of 1.0 V/sec. The dielectric breakdown voltage (BDV) of the electrolytic capacitor was measured in which an overcurrent of 1 A flowed. The average value of the resultant values was gained.

In Table 1 are shown evaluation results of Examples 1 to 8, and Comparative Example 1.

TABLE 1

|  | Example 1 | Example 2 | Example 3 | Example 4 | Example 5 | Example 6 | Example 7 | Comparative Example 1 | Example 8 |
|---|---|---|---|---|---|---|---|---|---|
| Capacitor | A | B | C | D | E | F | G | H | I |
| Liquid dispersion (First treating liquid) Production Example | H | H | H | H | H | H | H | H | H |
| Liquid dispersion (Second treating liquid) Production Example | A | B | C | D | E | F | G | H | I |
| First/second monomer ratio | 80/20 | 80/20 | 95/5 | 90/10 | 75/25 | 60/40 | 50/50 | 100/0 | 80/20 |
| Number (n) of ethylene oxide unit | 1 | 5 | 5 | 5 | 5 | 5 | 5 | 5 | 5 |
| ESR (mΩ) | 29 | 30 | 29 | 33 | 28 | 35 | 37 | 63 | 30 |
| LC good product proportion (%) | 94 | 98 | 92 | 96 | 98 | 90 | 89 | 68 | 94 |
| BDV (V) | 59 | 69 | 59 | 61 | 68 | 55 | 55 | 44 | 60 |

As shown in Table 1, Comparative Example 1 has larger leakage current than the working examples. This matter means that the individual working examples are made higher in dielectric-layer-repairing function than Comparative Example 1. Furthermore, the working examples can be made higher in voltage resistance property than Comparative Example 1. This is also because the individual working examples are made higher in dielectric-layer-repairing function than Comparative Example 1. When Example 2 and Example 8 are compared with each other, the leakage current is further restrained in Example 2. Thus, it is understood that the use of a copolymer of the first and second monomers more easily makes the dielectric-layer-repairing function high. Furthermore, according to Examples 3 to 7, the ratio by mole of the first unit to the second unit is more preferably from 95/5 to 50/50, even more preferably from 95/5 to 75/25.

Example 9

Electrolytic capacitors X of Example 9 were produced in a total number of 250 in the same way as in Example 1 except that their conductive polymer layer was formed in a manner described below, and were evaluated in the same manner. Evaluation results thereof are shown in Table 2.

(3-1) Step of Forming First Conductive Polymer Layer (Step A)

The anode body having the dielectric layer was immersed in an aqueous liquid dispersion (first treating liquid) containing 1% by mass of the polymer-dopant-doped conductive polymer yielded in Production Example A. The anode body was then taken out from the first treating liquid, and dried at 120° C. for a period from 10 minutes to 30 minutes. Each of the immersion in the first treating liquid and the drying was further repeated once to form a first conductive polymer layer to cover at least a part of the surface of the dielectric layer. According to a measurement of first conductive polymer layer 4a through a scanning electron microscope (SEM), this layer had an average thickness of about 1 μm.

(3-2) Step of Forming Second Conductive Polymer Layer (Step B)

The anode body having the first conductive polymer layer was immersed in an aqueous liquid dispersion (second treating liquid) containing 4% by mass of the polymer-dopant-doped conductive polymer yielded in Production Example H. The anode body was then taken out from the second treating liquid, and dried at 120° C. for a period from 10 minutes to 30 minutes both inclusive. Each of the immersion in the second treating liquid and the drying was further repeated twice to form a second conductive polymer layer to cover at least a part of the surface of the first conductive polymer layer, and at least a part of the dielectric layer exposed from the first conductive polymer layer. According to a measurement of second conductive polymer layer 4b through a scanning electron microscope (SEM), this layer had an average thickness of about 30 μm.

Example 10

Electrolytic capacitors Y of Example 10 were produced in a total number of 250 in the same way as in Example 1 except the use of an aqueous liquid dispersion (second treating liquid) containing 4% by mass of the polymer-dopant-doped conductive polymer yielded in Production Example J, and were evaluated in the same manner. Evaluation results thereof are shown in Table 2.

Example 11

Electrolytic capacitors Z of Example 11 were produced in a total number of 250 in the same way as in Example 1 except the use of an aqueous liquid dispersion (second treating liquid) containing 4% by mass of the polymer-dopant-doped conductive polymer yielded in Production Example K, and were evaluated in the same manner. Evaluation results thereof are shown in Table 2.

TABLE 2

| | Example 9 | Example 10 | Example 11 |
|---|---|---|---|
| Capacitor | X | Y | Z |
| Liquid dispersion (First treating liquid) Production Example | A | H | H |
| Liquid dispersion (Second treating liquid) Production Example | H | J | K |
| First/second monomer ratio | 80/20 | 80/20 | 80/20 |
| Number (n) of ethylene oxide unit | 5 | 5 | 10 |
| ESR (mΩ) | 33 | 29 | 35 |
| LC good product proportion (%) | 90 | 91 | 95 |
| BDV (V) | 55 | 62 | 66 |

As shown in Table 2, also in the case of using a polymer dopant containing the second unit in the first conductive polymer layer instead of the second conductive polymer layer, leakage current is made smaller in quantity than in Comparative Example 1. It is also understood that the same advantageous effects are gained when the phosphorus-containing group has a cationic group (Na), or when a number "n" of polyoxyalkylene groups of the phosphorus-containing group is 10.

The electrolytic capacitor according to the present disclosure is usable for various articles required to be deceased in leakage current.

What is claimed is:

1. An electrolytic capacitor comprising:
   an anode body;
   a dielectric layer formed on the anode body; and
   a conductive polymer layer covering at least a part of the dielectric layer;
   wherein:
   the conductive polymer layer comprises a conductive polymer and a polymer dopant;
   the polymer dopant comprises:
   (A) a first unit originating from a first monomer having a polymerizable group and a sulfonate group; and
   (B) a second unit originating from a second monomer having a polymerizable group and a phosphorus-containing group;
   the phosphorus-containing group is represented by at least one of following general formulae:

—P(=O)(OR$^1$)(OR$^2$), general formula (1):

—PH(=O)(OR$^3$), and general formula (2):

—PH$_2$(=O), general formula (3):

in the general formulae (1) to (3), each of R$^1$, R$^2$ and R$^3$ is independently a hydrogen atom, a hydrophilic group, a C$_1$ to C$_3$ alkyl group, or a cationic group, and
   a proportion of the second unit ranges from 5% by mole to 50% by mole both inclusive with respect to a total of the first unit and the second unit in the polymer dopant.

2. The electrolytic capacitor according to claim 1, wherein the phosphorus-containing group is represented by the general formula (1), and each of R$^1$ and R$^2$ is independently a hydrogen atom or a cationic group.

3. The electrolytic capacitor according to claim 1, wherein the phosphorus-containing group is represented by the general formula (2), and R$^3$ is a hydrogen atom or a cationic group.

4. The electrolytic capacitor according to claim 1, wherein the polymer dopant comprises a copolymer comprising the first unit and the second unit.

5. The electrolytic capacitor according to claim 1, wherein the polymer dopant comprises a first polymer comprising the first unit, and a second polymer comprising the second unit.

6. The electrolytic capacitor according to claim 1, wherein a proportion of the second unit ranges from 5% by mole to 25% by mole both inclusive with respect to a total of the first unit and the second unit in the polymer dopant.

7. The electrolytic capacitor according to claim 4, wherein:
   the first monomer is at least one selected from the group consisting of styrenesulfonic acid, and styrenesulfonic acid derivatives, and
   the second monomer is at least one of (meth)acrylic acid derivatives and maleic acid derivatives, the second monomer being further represented by at least one of general formula (4): R$^4$R$^5$C=CX$^1$R$^6$ and general formula (5): R$^7$X$^2$C=CX$^3$R$^8$ provided that in the general formula (4) or (5), each of X$^1$ to X$^3$ is independently represented by general formula (6): —CO—(OCH$_2$CH$_2$)$_n$—O—P(=O)(OR$^1$)(OR$^2$), and in the general formulae (4) to (6), n is a number from 1 to 10, each of R$^1$ and R$^2$ is independently a hydrogen atom or a cationic group, and each of R$^4$ to R$^8$ is independently a hydrogen atom or a methyl group.

8. The electrolytic capacitor according to claim 7, wherein in the general formulae (4) to (6), n is a number from 4 to 5, each of R$^4$, R$^5$, R$^7$ and R$^8$ is a hydrogen atom, and each of R$^1$ and R$^2$ is a hydrogen atom or a cationic group.

9. An electrolytic capacitor comprising:
   an anode body;
   a dielectric layer formed on the anode body; and
   a conductive polymer layer covering at least a part of the dielectric layer;
   wherein:
   the conductive polymer layer comprises a conductive polymer and a polymer dopant;
   the polymer dopant comprises:
   (A) a first unit originating from a first monomer having a polymerizable group and a sulfonate group; and
   (B) a second unit originating from a second monomer having a polymerizable group and a phosphorus-containing group; and
   the phosphorus-containing group is represented by at least one of following general formulae:

—PH(=O)(OR$^3$), and general formula (2):

—PH$_2$(=O), general formula (3):

in the general formula (2), R$^3$ is independently a hydrogen atom, a hydrophilic group, a C$_1$ to C$_3$ alkyl group, or a cationic group.

10. The electrolytic capacitor according to claim 9, wherein the phosphorus-containing group is represented by the general formula (2).

11. The electrolytic capacitor according to claim 9, wherein the phosphorus-containing group is represented by the general formula (2), and R$^3$ is a hydrogen atom, or a cationic group.

12. The electrolytic capacitor according to claim 9, wherein the polymer dopant comprises a copolymer comprising the first unit and the second unit.

13. The electrolytic capacitor according to claim 9, wherein the polymer dopant comprises a first polymer comprising the first unit, and a second polymer comprising the second unit.

14. An electrolytic capacitor comprising:
  an anode body;
  a dielectric layer formed on the anode body; and
  a conductive polymer layer covering at least a part of the dielectric layer;
  wherein:
  the conductive polymer layer comprises a conductive polymer and a polymer dopant;
  the polymer dopant comprises a copolymer comprising a first unit originating from a first monomer and a second unit originating from a second monomer;
  the first monomer has a polymerizable group and a sulfonate group, and
  the second monomer is at least one of (meth)acrylic acid derivatives and maleic acid derivatives, the second monomer being further represented by at least one of general formula (4): $R^4R^5C{=}CX^1R^6$ and general formula (5): $R^7X^2C{=}CX^3R^8$ provided that in the general formula (4) or (5), each of $X^1$ to $X^3$ is independently represented by general formula (6): $-CO-(OCH_2CH_2)_n-O-P({=}O)(OR^1)(OR^2)$, and in the general formulae (4) to (6), n is a number from 1 to 10, each of $R^1$ and $R^2$ is independently a hydrogen atom or a cationic group, and each of $R^4$ to $R^8$ is independently a hydrogen atom or a methyl group.

15. The electrolytic capacitor according to claim 14, wherein the first monomer is at least one selected from the group consisting of styrenesulfonic acid, and styrenesulfonic acid derivatives.

\* \* \* \* \*